United States Patent
Teterud et al.

(12)

(10) Patent No.: US 6,282,044 B1
(45) Date of Patent: Aug. 28, 2001

(54) 8V RING CLAMP CIRCUIT

(75) Inventors: Patrick M. Teterud, Plano; Kenneth J. Maggio, Dallas, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/286,187

(22) Filed: Apr. 5, 1999

Related U.S. Application Data

(60) Provisional application No. 60/080,984, filed on Apr. 7, 1998.

(51) Int. Cl.[7] .................................................. G11B 5/02
(52) U.S. Cl. .............................. 360/68; 360/46; 327/110; 327/309

(58) Field of Search .................................. 360/46, 67, 68; 327/180, 309, 110

(56) References Cited

U.S. PATENT DOCUMENTS

| | | | |
|---|---|---|---|
| 5,392,172 | * | 2/1995 | Yoshinaga et al. ............... 360/67 |
| 5,638,012 | * | 6/1997 | Hashimoto et al. .............. 327/110 |
| 6,166,579 | * | 12/2000 | Hojabri et al. ................... 327/308 |

* cited by examiner

*Primary Examiner*—David Hudspeth
*Assistant Examiner*—Dan I. Davidson
(74) *Attorney, Agent, or Firm*—W. Daniel Swayze, Jr.; W. James Brady; Frederick J. Telecky, Jr.

(57) ABSTRACT

A clamp circuit for clamping a terminal of an H-bridge circuit. The clamp circuit is capable of being applied to a voltage in excess of 5V including 8 volts.

6 Claims, 2 Drawing Sheets

8V RING CLAMP CIRCUIT

This application claims priority under 35 USC § 119(e)(1) of provisional application No. 60/080,984 filed Apr. 7, 1998.

FIELD OF THE INVENTION

The present invention relates to write drivers for an inductive head in a magnetic data storage system and more particularly to write drivers that include a damping circuit connected to an H-bridge circuit to drive the head.

BACKGROUND OF THE INVENTION

Conventional storage systems include an inductive head that uses an inductive element to write information onto a recording surface of the magnetic medium, such as a magnetic disk. The inductive element usually includes an inductive coil that writes information by creating a changing magnetic field near the magnetic medium. A write driver circuit is connected to the magnetic head at two head terminals. During writing operations, the write driver circuit forces a relatively large write current through the inductive coil to create a magnetic field that polarizes adjacent bit positions on the recording surface. Digital information is stored by reversing the polarization of selected bit positions which is done by reversing the direction of the current flow in the inductive coil.

The typical write driver circuit includes an "H-switch" for controlling the direction of current flow through the inductive coil. The H-switch includes upper "pull-up" bi-polar transistors and lower "pull-down" bi-polar transistors. The upper bi-polar transistors are connected between a first supply voltage and the head contacts or terminals. The lower bi-polar transistors are connected between another set of head terminals and a second supply voltage through a write current sink. The write driver circuit controls the direction of flow through the inductive coil by driving selected transistors in the H-switch between ON and OFF states, thereby applying a limited voltage swing across the head contacts or terminals for reversing current flow and polarizing the adjacent bit position on the magnetic medium.

The rate at which information can be stored on a recording surface through an inductive head is directly proportional to the rate at which the direction of current can be reversed in the inductive coil. The rise/fall time of the inductive coil is determined by:

$$di/dt = V/L$$

where di/dt is the rate of change of the current over time across the inductive coil, V is the available voltage across the inductive coil, and L is the inductive load. Therefore, the speed of the H-switch is directly proportional to the available voltage across the inductive coil. The available voltage is determined by subtracting the voltage drops across the pull-up transistors, the pull-down transistors, and the write current sink from the supply voltage. FIG. 3 illustrates a clamp circuit of the prior art.

The write circuit is a portion of a preamplifier system. The preamplifier system also includes a read circuit which, together with the write circuit, reads and writes information to and from the magnetic medium.

A preamplifier system is connected to the magnetic head coil at the head contacts.

SUMMARY OF THE INVENTION

The write circuit of the present invention provides protection for devices that may have 8 volts across the device from the breakdown which results as the voltage approaches 8 volts. The present invention provides a clamping function with overshoot control and ringing control.

The present invention protects the lower transistors of an H-bridge circuit from saturating and reduces the excursions of the output nodes (HX, HY). More particularly, the present invention dampens the negative ringing resulting from transitions. Additionally, the write circuit of the present invention allows Schottky diodes to be removed from the collector of the lower transistors of the bridge circuit. The write driver of the present invention charges the output nodes of the writer during time periods of transitions. The write driver of the present invention compensates for transient voltages which are the result of the head inductance. Furthermore, the present invention protects 5-volt devices in 8-volt supply environments.

DETAILED DESCRIPTION OF THE PRESENT INVENTION

The following invention is described with reference to the figures in which similar or the same numbers represent the same or similar elements. While this invention is described in terms for achieving the invention's objectives, it can be appreciated by those skilled in the art that variations may be accomplished in view of these teachings without deviation from the spirit or scope of the invention.

Figure 1:
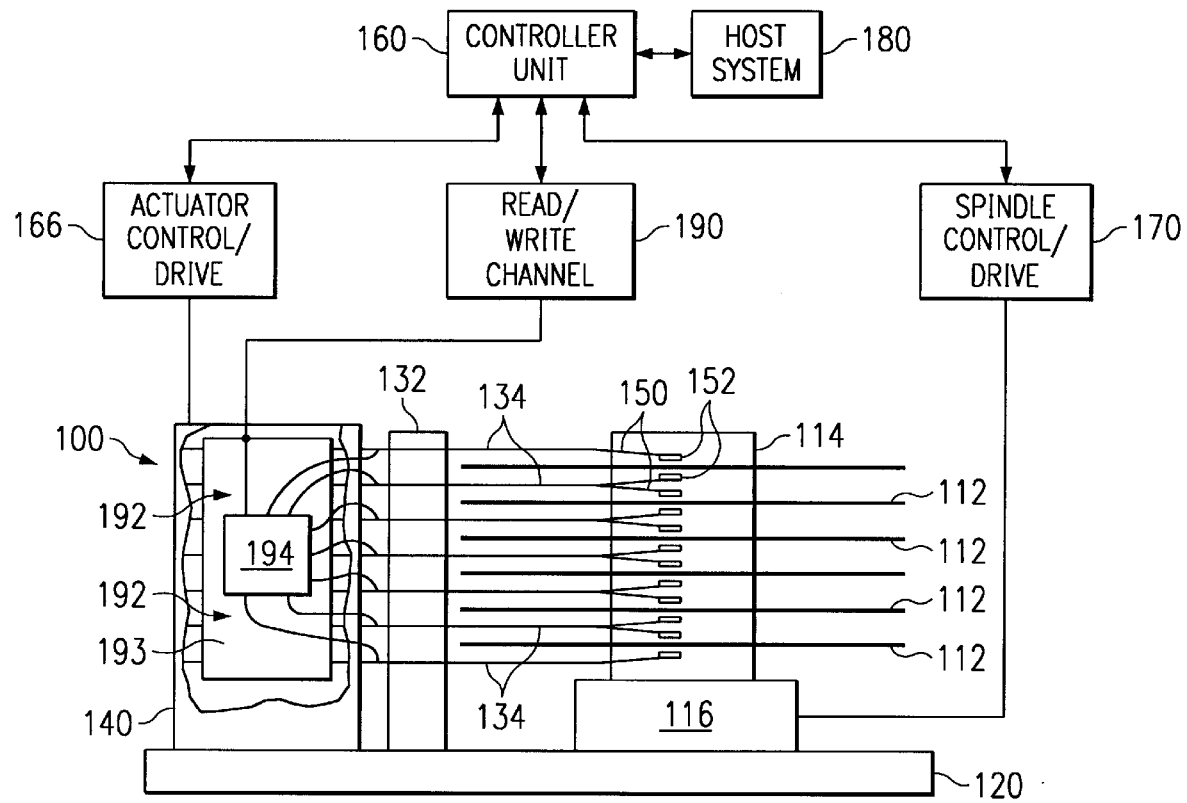
FIG. 1 is a side view of a disk drive system.
Figure 2:
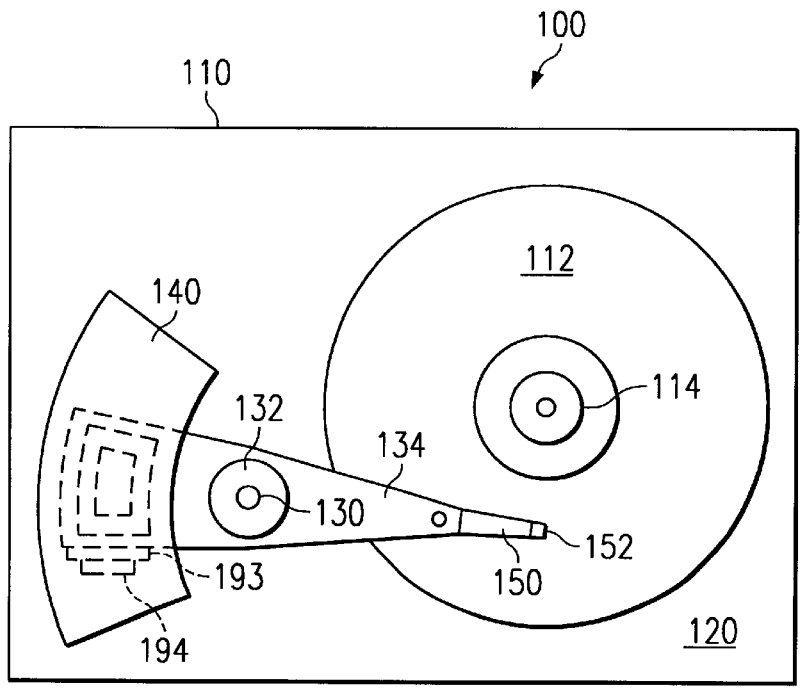
FIG. 2 is a top view of a disk drive system.
Figure 3:
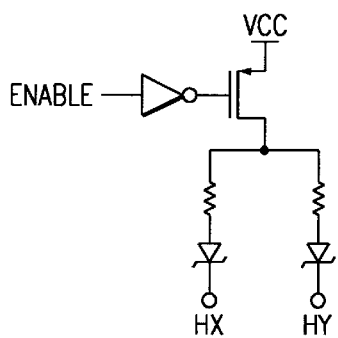
FIG. 3 illustrates a clamp circuit.

FIGS. 1 and 2 show a side and top view, respectively, of the disk drive system designated by the general reference 100 within an enclosure 110. The disk drive system 100 includes a plurality of stacked magnetic recording disks 112 mounted to a spindle 114. The disks 112 may be conventional particulate or thin film recording disk or, in other embodiments, they may be liquid-bearing disks. The spindle 114 is attached to a spindle motor 116 which rotates the spindle 114 and disks 112. A chassis 120 is connected to the enclosure 110, providing stable mechanical support for the disk drive system. The spindle motor 116 and the actuator shaft 130 are attached to the chassis 120. A hub assembly 132 rotates about the actuator shaft 130 and supports a plurality of actuator arms 134. The stack of actuator arms 134 is sometimes referred to as a "comb." A rotary voice coil motor 140 is attached to chassis 120 and to a rear portion of the actuator arms 134.

A plurality of head suspension assemblies 150 are attached to the actuator arms 134. A plurality of inductive transducer heads 152 are attached respectively to the suspension assemblies 150, each head 152 including at least one inductive write element. In addition thereto, each head 152 may also include an inductive read element or a MR (magneto-resistive) read element. The heads 152 are positioned proximate to the disks 112 by the suspension assemblies 150 so that during operation, the heads are in electromagnetic communication with the disks 112. The rotary voice coil motor 140 rotates the actuator arms 134 about the actuator shaft 130 in order to move the head suspension assemblies 150 to the desired radial position on disks 112.

A controller unit 160 provides overall control to the disk drive system 100, including rotation control of the disks 112 and position control of the heads 152. The controller unit 160 typically includes (not shown) a central processing unit (CPU), a memory unit and other digital circuitry, although it should be apparent that these aspects could also be enabled as hardware logic by one skilled in the computer arts. Controller unit 160 is connected to the actuator control/drive unit 166 which is in turn connected to the rotary voice coil motor 140. A host system 180, typically a computer system or personal computer (PC), is connected to the controller unit 160. The host system 180 may send digital data to the controller unit 160 to be stored on the disks, or it may request that digital data at a specified location be read from the disks 112 and sent back to the host system 180. A read/write channel 190 is coupled to receive and condition read and write signals generated by the controller unit 160 and communicate them to an arm electronics (AE) unit shown generally at 192 through a cut-away portion of the voice coil motor 140. The AR unit 192 includes a printed circuit board 193, or a flexible carrier, mounted on the actuator arms 134 or in close proximity thereto, and an AE module 194 mounted on the printed circuit board 193 or carrier that comprises circuitry preferably implemented in an integrated circuit (IC) chip including read drivers, write drivers, and associated control circuitry. The AE module 194 is coupled via connections in the printed circuit board to the read/write channel 190 and also to each read head and each write head in the plurality of heads 152. The AE module 194 includes the write circuit of the present invention.

Figure 4:
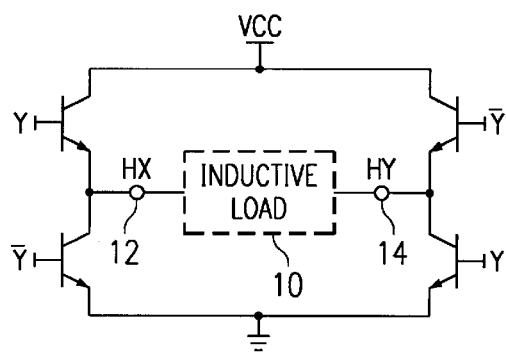
FIG. 4 illustrates an H-bridge circuit.

As discussed above, the electronic circuitry used to drive current through a HDD write head typically uses an H-bridge as shown in FIG. 4. This figure represents a simplified circuit of the write driver, sometimes referred to as the "writer" circuit. Typically, the write driver circuit includes additional circuitry for driving the Y and $\overline{Y}$ inputs, with the top two or bottom two transistors setting the current value. The purpose of the H-bridge is to allow electric current to be driven through the write head in either direction. When the current is driven in one direction, a magnetic field is created with the north pole in one direction; and when the current is driven in the opposite direction, a magnetic field is created with the north pole in the opposite direction. The magnetic field is then used to "write" data to the disk platter by magnetizing a small region on the disk platter.

The H-bridge operates to switch the drive current through the head by turning on a pair of transistors to allow current to flow in a path from a supply source to ground. For example, current flows through the write head from HX to HY when transistors Y are turned on and transistors $\overline{Y}$ are turned off. Similarly, current flows in the opposite direction when transistors $\overline{Y}$ are turned on and transistors Y are turned off. The DC operating point of the write head is the voltage at either side of the head when write current has settled through the head at its desired current setting.

Since the HDD write head is an inductive load, there are voltage and current swings (a characteristic transient ring) at the HX and HY outputs when the current through the head is reversed rapidly. It is desirable to increase the write frequency of the write head current transition without increasing the ringing period at these write outputs of the writer circuit.

Figure 5:
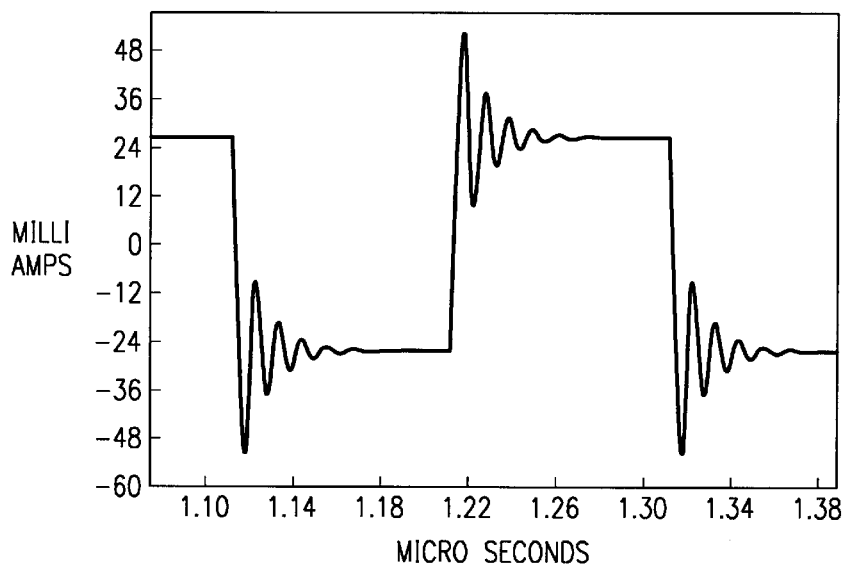
FIG. 5 illustrates waveform of transitions with overshoot and ring.

FIG. 5 illustrates magnetic transition by the nearly vertical changes in write current. The first excursion over a steady state value is overshoot. The remaining damped sinusoidal waveform is the ringing effect.

Figure 6:
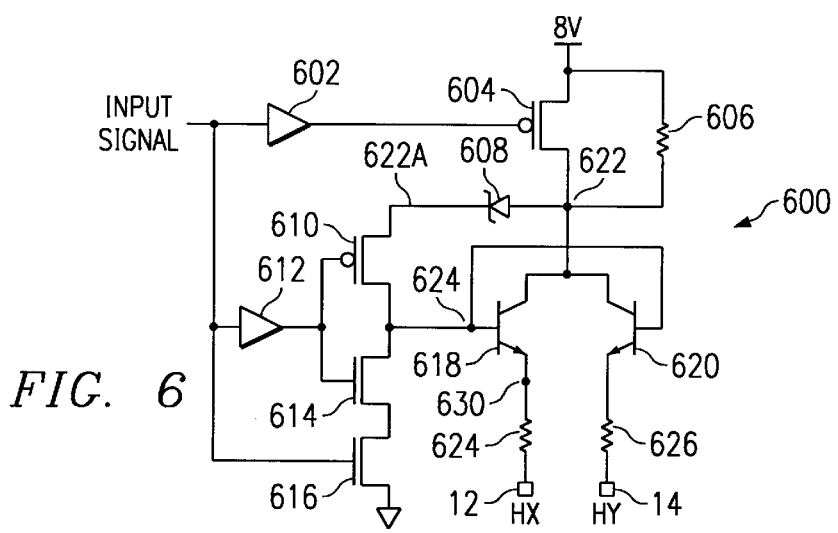
FIG. 6 illustrates a circuit of the present invention.

In operation, the circuit of FIG. 6 reduces the transient ring and overshoot by charging current into nodes HX and HY, illustrated as elements 14 and 12 in FIGS. 4 and 6, when these nodes have a negative voltage due to the transient fluxation of these nodes when the current is reversed rapidly. Thus, the circuit 600 of the present invention dampens the current ringing in the write head by connecting the circuit 600 shown in FIG. 6 at the terminals 12 and 14.

Turning now to FIG. 6, the input signal is input to the voltage shift circuit 602, the voltage shift circuit 612, and to the gate of NFET 616. Typically, the input signal is a digital signal that ranges between 0/5V. This input signal enables the clamping circuit 600. The voltage shift circuit 602 shifts the input voltage, which varies between a low level of 0 volts to a high level of 5 volts. The voltage shift circuit 602 shifts the low level signal and outputs a 3-volt signal. Additionally, the voltage shift circuit 602 inputs the input signal at a high level and shifts this high level to 8 volts. While 8 volts is disclosed, any voltage between 5 volts and 8 volts is usable with the present invention. The output of the voltage shift circuit 602 is input to the gate of PFET 604. The source of PFET 604 is connected to 8 volts. In addition, the source of PFET 604 is connected to resistor 606. The other end of resistor 606 is connected to the drain of transistor 604. Node 622 is connected to the drain of PFET 604 and connected to the common connected collectors of bipolar transistors 618 and 620. The node 622 is connected to the input of diode 608. The output of diode 608 is connected to the source of PFET 610. The drain of PFET 610 is connected to node 624 and connected to the drain of NFET 614. The source of NFET 614 is connected to the drain of NFET 616. The source of NFET 616 is connected to ground. NFET 614 and NFET 616 are a pull-down circuit to pull node 624 to ground. Node 624 is connected to the base of transistor 618 and to the base of transistor 620. The collector of transistor 618 is connected to resistor 624. The other end of resistor 624 is connected to terminal 12. The collector of transistor 620 is connected to resistor 626. The other end of resistor 626 is connected to terminal 14. The gate of NFET 616 is connected to receive the input signal. The gate of PFET 610 and the gate of NFET 614 are commonly connected to the output of voltage shift circuit 612.

In operation, if the input signal is 0, the output of the voltage shift circuit 602 is 3 volts. This 3 volts output from voltage shift circuit 602 is sufficient to turn PFET 604 on. As a result of the 3 volts at the gate of PFET 604, PFET 604 does not see anything greater than 5 volts, gate to source or gate to drain. The node 622 is approximately at 8 volts with PFET 604 turned on. The diode 608 outputs approximately 7.5 volts with approximately 0.5V drop. With the input signal circuit (enabled) at 0 volts, the output of voltage shift circuit 612 is 3 volts. This is sufficient to turn PFET 610 on. Consequently, the voltage at node 624 is approximately 7.5 volts. NFET 614 will be turned off, eliminating a path to ground. Node 630 will be at approximately 6.5 volts with transistor 618 almost completely turned off. Consequently, terminal 12 is clamped at approximately 6.3 volts.

When the input signal (disabled) is on, or at 5 volts, the voltage shift circuit 602 outputs a voltage of 8 volts. This 8 volts output from circuit 602 is sufficient to turn off PFET 604. The voltage at the output of diode 608 will be approximately 5 volts. With the input signal on, or at 5 volts, the output of the voltage shift circuit 612 is approximately 5 volts. The PFET 610 is turned off. However, the NFET 614 and NFET 616 are turned on, pulling the voltage at node 624 to ground. Consequently, the voltage at node 630 is also at ground, therefore assuring transistors 618 and 620 to be off.

It can be seen that, for example,

Nd 622≈8V

Nd622A≈8V−1 Schottky diode drop,

Nd 624≈8V−1 Schottky diode drop, and

Nd 630≈Nd 624−$V_{be}$

When the circuit is enabled (OV in) there are two states the circuit can be in:

(1) transient condition: Nd12 voltage pulling to ground, thus causing transistor 618 to source a current. The lower node 12 is pulled down, the higher the transient current.

(2) D.C. condition: When Nd 12 voltage has settled and Nd 12's voltage is high enough where the current supplied by transistor 618 negligible to the circuit application.

What is claimed is:

1. A clamp circuit for clamping a terminal, comprising:

an H-bridge circuit capable of driving a current through a head;

a first transistor for connection to said H-bridge circuit;

a second transistor for connection to said H-bridge circuit;

a voltage source to generate a voltage in excess of 5V; and a third transistor connected to said voltage source and to a first collector of said first transistor and a second collector of said second transistor.

2. A clamp circuit as in claim 1, wherein said clamp circuit further comprises a voltage shift circuit and wherein said third transistor is connected to said voltage shift circuit.

3. A clamp circuit as in claim 1, wherein said clamp circuit further comprises a pull-down circuit to pull down the voltage.

4. A system for reading and writing information on a disk, comprising:

a read/write circuit for reading and writing data on a disk;

a preamplifier for amplifying the data read from disk;

a read channel for conditioning the data;

a controller to communicate with a host system, wherein said read/write circuit includes a clamp circuit having:
an H-bridge circuit capable of driving a current through a head;
a first transistor for connection to said H-bridge circuit;
a second transistor for connection to said H-bridge circuit;
a voltage source to generate a voltage in excess of 5V; and
a third transistor connected to said voltage source and to a first collector of said first transistor and a second collector of said second transistor.

5. A system for reading and writing information on a disk as in claim 4, wherein said clamp circuit further comprises a voltage shift circuit and wherein said third transistor is connected to said voltage shift circuit.

6. A system for reading and writing information on a disk as in claim 4, wherein said clamp circuit further comprises a pull-down circuit to pull down the voltage.

* * * * *